United States Patent
Zhang et al.

(10) Patent No.: US 10,521,280 B2
(45) Date of Patent: Dec. 31, 2019

(54) EVENT-DRIVEN SERVERLESS FUNCTION ORCHESTRATION

(71) Applicant: Futurewei Technologies, Inc., Plano, TX (US)

(72) Inventors: Hong Zhang, Palo Alto, CA (US); Henry Louis Fourie, Livermore, CA (US); Farhad Sunavala, San Ramon, CA (US)

(73) Assignee: Futurewei Technologies, Inc., Plano, TX (US)

(*) Notice: Subject to any disclaimer, the term of this patent is extended or adjusted under 35 U.S.C. 154(b) by 2 days.

(21) Appl. No.: 15/858,359

(22) Filed: Dec. 29, 2017

(65) Prior Publication Data
US 2019/0205184 A1     Jul. 4, 2019

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |
| *G06F 9/50* | (2006.01) |

(52) U.S. Cl.
CPC .......... *G06F 9/542* (2013.01); *G06F 9/5083* (2013.01)

(58) Field of Classification Search
CPC ....................................................... G06F 9/542
USPC ....................................................... 719/318
See application file for complete search history.

(56) References Cited

U.S. PATENT DOCUMENTS

| | | | |
|---|---|---|---|
| 2006/0212592 A1* | 9/2006 | Gupta | G06F 9/5027 709/230 |
| 2013/0329632 A1 | 12/2013 | Buyukkoc et al. | |
| 2018/0150529 A1* | 5/2018 | McPherson | G06F 16/254 |
| 2018/0302277 A1* | 10/2018 | Shimamura | H04L 41/145 |

FOREIGN PATENT DOCUMENTS

| | | |
|---|---|---|
| CN | 103220180 A | 7/2013 |
| CN | 107148767 A | 9/2017 |
| EP | 1248441 A2 | 10/2002 |
| WO | 2016070108 A1 | 5/2016 |

OTHER PUBLICATIONS

International Search Report dated Feb. 21, 2019, in PCT Patent Application No. PCT/CN2018/119527, 9 pages.
"European Application No. 18882265.4, Extended European Search Report dated Nov. 7, 2019", (Nov. 7, 2019), 9 pgs.
Baldini, Ioana, et al., "Serverless Computing: Current Trends and Open Problems", ARXIV.org, Cornell University Library, 201 Olin Library, Cornell University, Ithaca, NY, (Jun. 10, 2017), 20 pgs.

* cited by examiner

*Primary Examiner* — Timothy A Mudrick
(74) *Attorney, Agent, or Firm* — Schwegman Lundberg & Woessner, P.A.

(57) ABSTRACT

The disclosure relates to technology for coordinating execution of serverless functions. One or more events are received from one or more external sources. The one or more events are mapped to one or more event states of a processing graph according to mapping rules, the one or more event states including one or more actions, and the one or more actions are executed in response to the one or more events satisfying conditions of the mapping rules. An event response is the received in reply to the received one or more events, where the event response is based on execution of one or more tasks corresponding to a sequence of the executed one or more actions.

20 Claims, 9 Drawing Sheets

```
302A
{"service-graph-name": {
    "event-defs": [
        {"name": "Ev1",
         "source": "Event-Source1"},
        {"name": "Ev2",
         "source": "Event-Source2"}],
    "states": [
        "State1": {
            "type": "EVENT",
            "event-list": [{
            "event-expression":"Ev1 OR Ev2",
            "action-mode": "SEQUENTIAL",
            "actions": [{
                "action1": {
                    "function": FN-A},
                "action2": {
                    "function": FN-B}
                    ...
                "actionN": {
                    "function": FN-N}
            }],
            "next-state": "State2",
        }]
}
```

EVENT-DRIVEN SERVERLESS FUNCTION ORCHESTRATION

FIELD

The disclosure generally relates to coordinating execution of serverless functions, and in particular, mapping events from external sources to serverless functions.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

Serverless functions are one example of services in which individual code functions are executed in the cloud. This differs from a virtual machine (VM) service in which the compute environment consists of entire VM instances. Serverless functions alleviate the need for the user to deploy and manage physical servers on which these functions execute. In addition, users are only billed for the actual execution time of each Serverless function instance and not for idle time of the physical servers and VM instances. Another benefit is continuous scaling of function instances to address varying traffic load.

BRIEF SUMMARY

According to one aspect of the present disclosure, there is provided a method for coordinating execution of serverless functions, including receiving one or more events from one or more external sources; mapping the one or more events to one or more event states of a processing graph according to mapping rules, the one or more event states including one or more actions; executing the one or more actions in response to the one or more events satisfying conditions of the mapping rules; and receiving an event response in reply to the received one or more events, the event response based on execution of one or more tasks corresponding to a sequence of the executed one or more actions.

Optionally, in any of the preceding aspects, the one or more external events are asynchronous or synchronous.

Optionally, in any of the preceding aspects, the method further sequentially or concurrently executing the one or more actions by the one or more event states, wherein each of the one or more actions invokes a corresponding serverless function such that a payload or metadata included in the event is passed to the corresponding serverless function for execution.

Optionally, in any of the preceding aspects, the method further includes sending an event response to the one or more external sources from which the one or more events originated upon completion of executing the sequence of the one or more actions.

Optionally, in any of the preceding aspects, the event response includes a single payload or metadata for the sequentially executed one or more actions.

Optionally, in any of the preceding aspects, the event response includes a combined payload or metadata for the concurrently executed one or more actions.

Optionally, in any of the preceding aspects, the method further includes filtering contents of the payload or metadata to modify the payload or metadata based on filtering and transformation criteria; and combining multiple event responses matching the one or more completed concurrent actions of an event state into a payload or metadata of a single event response.

Optionally, in any of the preceding aspects, the method further includes independently executing a subset of the one or more actions.

Optionally, in any of the preceding aspects, one or more subsets are nested to define a combination of sequentially and concurrently executed one or more actions.

Optionally, in any of the preceding aspects, in response to the one or more external events not being received, a timeout occurs after a predetermined period of time.

According to one aspect of the present disclosure, there is provided a device for coordinating execution of serverless functions, comprising a non-transitory memory storage comprising instructions; and one or more processors in communication with the memory, wherein the one or more processors execute the instructions to receive one or more events from one or more external sources; map the one or more events to one or more event states of a processing graph according to mapping rules, the one or more event states including one or more actions; execute the one or more actions in response to the one or more events satisfying conditions of the mapping rules; and receive an event response in reply to the received one or more events, the event response based on execution of one or more tasks corresponding to a sequence of the executed one or more actions.

According to one other aspect of the present disclosure, there is provided a non-transitory computer-readable medium storing computer instructions for a non-transitory computer-readable medium storing computer instructions for coordinating execution of serverless functions, that when executed by one or more processors, cause the one or more processors to perform the steps of receiving one or more events from one or more external sources; mapping the one or more events to one or more event states of a processing graph according to mapping rules, the one or more event states including one or more actions; executing the one or more actions in response to the one or more events satisfying conditions of the mapping rules; and receiving an event response in reply to the received one or more events, the event response based on execution of one or more tasks corresponding to a sequence of the executed one or more actions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for coordinating execution of serverless functions, and in particular, to coordinating execution of serverless functions by mapping events from external sources to the serverless functions using function graphs.

An event-driven architecture is a framework that orchestrates behavior around the production, detection and consumption of events, as well as the responses they evoke. An event may be any identifiable occurrence that has significance for system hardware or software. Typically, an event-driven architecture consists of event creators, which is the source of the vent, and event consumers, which are entities that become aware of an event occurrence and often process the events.

Function graphs within the event-driven architecture can orchestrate serverless functions (i.e., cloud functions) to control execution of the functions for a wide variety of application use cases, such as business logic, healthcare management and the like. Function graphs can be viewed as a collection of states and the transitions and branching between these states, which may be invoked by command or triggered dynamically on arrival of an event from an event source. The function graphs also enable the arrangement of the functions to be executed in sequence or concurrently, manage error conditions and handle scaling to accommodate varying event load.

An event from an event source may be associated with a specific event state within a function graph. These event states within a function graph will wait for the arrival of events from the specific event source before performing one or more associated actions and progressing to the next state. Accordingly, the function graphs may define states at which to wait before executing the serverless function actions and progressing through the function graph before ultimately transitioning to the next state.

In one embodiment, an event processing server or controller within the event-driven architecture allows for the instantiation and dispatch of multiple function graphs as needed. As events arrive at the event processing server, a set of rules map the events to the function graphs for processing.

In one other embodiment, the function graphs provide a mechanism to transform the event payload as the payload progresses through the function graphs.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
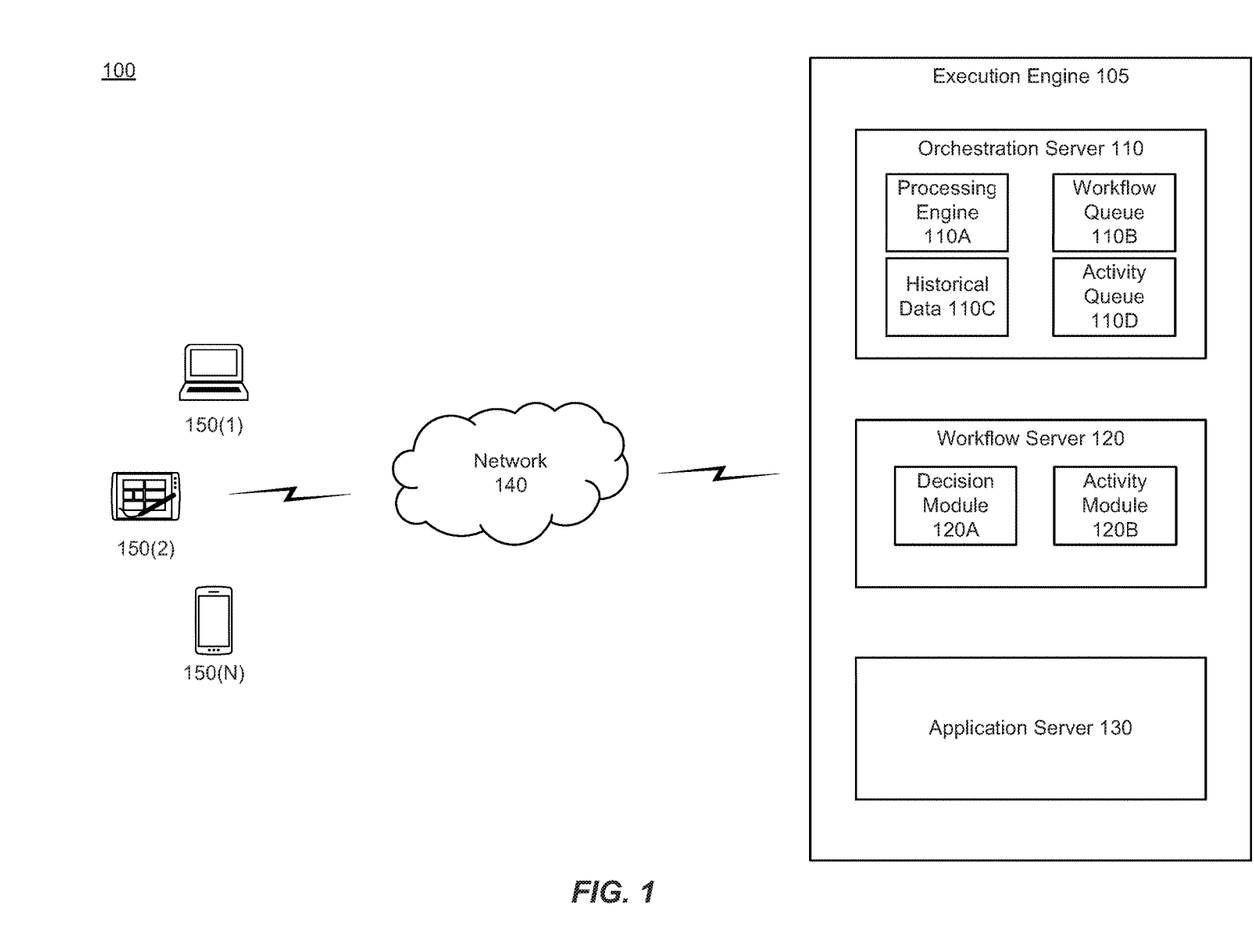
FIG. 1 illustrates an example network including an execution engine performing workflow processing.

FIG. 1 illustrates an example network including an execution engine performing workflow processing. The network 100 includes an execution engine 105 that operates in a distributed computing environment including several computer systems that may be interconnected using, for example, one or more computer networks (not shown). The execution engine 105 includes an orchestration server 110, a processing server 120 and an application server 130, which together are connectable to one or more end user devices 150(1)-(N) via network 140. In one embodiment, the functional components executed in the servers 110, 120 and 130 can be executed within a single server or the same pool of servers.

The orchestration server 110 includes a processing engine 110A, workflow queue(s) 110B, historical data 110C and activity queue(s) 110D. The processing engine 110A can be executed to orchestrate the execution of various workflow instances. Implementation of a workflow instance can involve placement of a workflow, or data related to a workflow, in the workflow queue 110B. Each workflow queue 11B may correspond to a different type of workflow, a different workflow server 120, a combination thereof, or any other logical separation of queued workflows, including those determined by load balancing techniques, etc.

The processing engine 110A can be a computer executable program or collection of programs. In one embodiment, the processing engine is associated with the historical data 110C to assist in orchestration. The historical data 110C may include, for example, a list of events that have occurred during the implementation of a given workflow instance over time. The events listed can include activities executed on behalf of the workflow instance, such as the scheduling of an activity, the execution of an activity, the completion of an activity, the starting or stopping of a timer, etc. The historical data 110C can be stored in an electronic data store, such as a memory, database, hard disk, etc.

The components implemented on the workflow server 120 can include decision module 120A and activity module 120B. Workflow definitions may be embodied in functional code in the decision modules 120A and can be configured to identify the activities, actions, or steps to be performed for a specific workflow instance based upon the functional expression of a workflow definition. For example, each decision module 120A can embody a workflow definition in the form of functional logic as may be expressed, for example, in terms of programmed code, such as Java or C++.

Activity modules 120B can be executed to perform one or more actions, tasks, or functions that include at least a portion of a workflow instance based upon a command from a decision module 120A. The activity modules 120B can be implemented as Java classes that are each instantiated multiple times in order to handle the workflow processing load from the decision modules 120A. An activity queue 120B on the orchestration server 110 can be associated with each type or class of activity module 120B. In response to a decision module 120A issuing a command to execute an activity module 120B, the processing engine 110A can place the command in the activity queue 110D to be executed by the corresponding activity module 120B The network 140 can be any wired network, wireless network or combination thereof. In addition, the network 140 can be a personal area network, local area network, wide area network, cable network, satellite network, cellular telephone network, the Internet, etc., or any combination thereof. Each of the workflow orchestration server 110, workflow processing server 120, and application server 130 can be a physical computing device configured to execute software applications. In some embodiments, the servers 110, 120, 130 can be configured to execute one or more software applications on the same single physical or virtual device, across multiple physical/virtual devices, or any combination thereof.

The end-user devices 150(1)-(N) can communicate with the various components of the execution engine 105 over the network 140. The end-user devices 150(1)-(N) are not limited to those depicted and can be any of a number of computing devices that are capable of communicating over a network including, but not limited to, a laptop, personal computer, personal digital assistant (PDA), hybrid PDA/mobile phone, mobile phone, electronic book reader, digital media player, tablet, head mounted display devices, and the like.

In operation, the orchestration server 110 can receive notification of an event from the application server 130 or an end-user device 150(1)-(N). In response, the orchestration server 110 loads a new instance of a workflow into a workflow queue 110B. In some embodiments, the specific workflow instantiated in response to the event can depend based on the event, with various events associated with different workflows, etc. The workflow server 120 can be configured to poll the workflow orchestration server 110 for queued workflows to process, and can receive information about queued workflows that the workflow server 120 is configured to process.

Processing a workflow can involve determining which activity or activities to execute or schedule for execution based on the current event. Each time the workflow processing server 120 processes an activity, it can generate a command, raise an error, or otherwise initiate, a notification to the workflow orchestration server 110, which the workflow orchestration server 110 can save as historical data 110C. In some embodiments, the command can be an instruction to execute a program or routine, to start or stop a timer, to send a message to another component or an external process, etc. The workflow process can then be queued for further processing.

Figure 2:
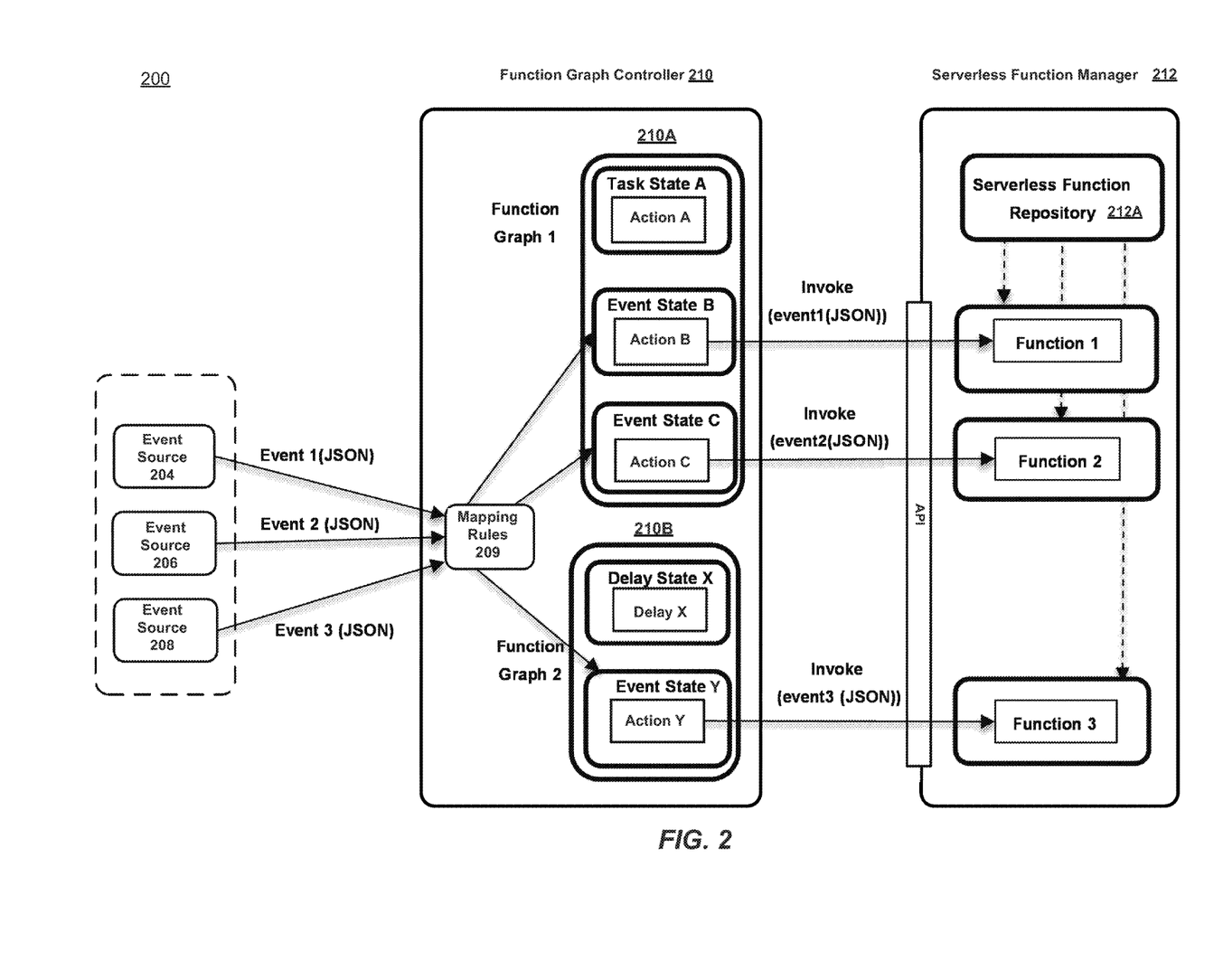
FIG. 2 illustrates an example event-driven orchestration system.

FIG. 2 illustrates an example event-driven orchestration system. Event-driven orchestration system 200 may include one or more event different sources 204, 206, 208, an Function Graph Controller (FGC) 210 (also referred to herein as an Function Graph Orchestrator) that is configured to provide an environment for processing events from the event sources 204, 206, 208. The event sources 204, 206, 208 generate events that are received by FGC210. For example, FGC 210 receives events 1, 2 and 3 from event sources 204, 206 and 208, respectively. In one embodiment, each of events 1, 2 and 3 include an event request comprising a payload, such as a JavaScript Object Notation (JSON) payload. JSON payloads are represented in FIG. 2 as J1-J5, and discussed in more detail below. It is appreciated that any type of payload may be employed and the disclosure is not limited to JSON payloads.

One or more event processing applications may be deployed on and be executed by FGC 210. In one embodiment, the event processing applications executed by FGC 210 may be configured to listen for one or more events, process the events 1, 2 and 3 based upon processing logic (e.g., mapping rules 209) that selects one or more events 1, 2 and 3 received from the event sources 204, 206 and 208. In one other embodiment, processing applications may be implemented as a state machine, such as state machine 210A, which in turn implement workflows that invoke cloud services or functions (also referred to as microservices).

State machines may be represented as a function or service graph, such as function graphs 1 and 2. Each function graph may include, for example, states, events, actions and action results. States may have various and different behaviors, such as a delay state, a switch state, an event state, an operation state and a NoOp state. For example, the delay state causes the function graph execution to wait for a specified duration, the switch state permits transitions to multiple other states based on the contents of the payload, the operation state allows the execution of one or more serverless functions and specifies a list of actions to be executed. Additionally, the event state allows for handling of events from different event sources and specifies a list of event-expression structures that are used to match incoming events. In one embodiment, the first event to match an "event-expression" (Boolean expression) for the state will cause actions for the "event-expression" to be executed followed by a transition to the next state ("event-expressions" are discussed below). Finally, the end state terminates the state machine and reports the status, and the NoOp state is a pass-through state.

Each event state has a list of one or more actions which may be executed. Each action performs the execution of a serverless function. In one embodiment, the one or more actions can be executed in sequence. In another embodiment, the one or more actions may be executed in parallel. In still another embodiment, the actions may be executed as any combination of sequential and/or parallel actions. For each action, there is a list of action results that handle the result of the action, such as retry handling, next state transitions and function graph termination. In one embodiment, the function graph is defined in JavaScript Objection Notation (JSON), as described below, although it is not limited to such a language. Other languages, such as YAML, XML and the like may also be employed.

Event-driven applications may be rule-driven (e.g., by mapping rules 209), where the rules may be communicated as an expression used to process the received events. The expressions may include, for example, instructions that identify the processing to be performed for the received events. For example, the expressions may be formed as: event→function graph [/state]. As will become apparent from the examples discussed below, the expression may also perform filtering and merging (or aggregation) functions to transform and extract particular data from the received events.

More specifically, as events 1, 2 and 3 are mapped from event sources 204, 206 and 208, into the state machines 210A and 210B, the event states B, C and Y are triggered to thereby execute one or more associated actions by the event processing applications. For example, in the depicted embodiment, the mapping rules for each of events 1, 2 and 3 may be expressed as follows: Event 1→Function Graph1/state B→Function 1; Event 2→Function Graph1/state C→Function 1; and Event 3→Function Graph 2/state Y. Accordingly, the event processing applications may include instructions for causing a computing device to perform one or more of actions B, C and Y for a corresponding event 1, 2 and 3.

In one embodiment, FGC 210 employs the state machines 210A and 210B to implement workflows that invoke the serverless function associated with a particular action. For example, in the case of an event sent by event source 204, event 1 is received at the FGC 210 and directed by the mapping rules 209 to forward the payload associated with event 1 to event state B of function graph 1. At event state B, action B is processed by the function graph controller which in turn invokes a serverless function (e.g., function 1) in the serverless function manager 212.

In one embodiment, the functions may be stored in repository 212A and deployed in separate containers for isolation and modularity, while also providing enhanced quality and reliability with integrated testing, logging, monitoring, and diagnostic strategies.

Each function will be understood to include a software application (e.g., service) that is comprised of a plurality of independently deployable services. These functions represent serverless functions that may also be broken down into smaller services (microservices) organized, for example, around business capability (e.g., API engine, REST interfaces, socket connection, monitoring, and notifications).

It should be appreciated that event-driven orchestration system 200 depicted in FIG. 2 may have other components than those illustrated and that the disclosed embodiments are non-limiting. Further, the embodiment shown in FIG. 2 is only one example of a system that may incorporate an embodiment of the present disclosure. In some other embodiments, event-driven orchestration system 200 may have more or fewer components than shown in FIG. 2, may combine two or more components, or may have a different configuration or arrangement of components. For example, although FGC 210 is illustrated as receiving three events from three event sources, this is not intended to be limiting. In alternative embodiments, an FGC 210 may be configured to listen to any number of events received from any number of event sources, map the events from the event sources to event states in the function graph and output the selected events to a serverless function manager 212 to invoke serverless functions associated with the events. Moreover, any number of event state machines and function graphs may be employed, which includes any number of states and actions.

It is also appreciated that event-driven orchestration system 200 can be of various types including a personal computer, a portable device (e.g., a mobile telephone or device), a workstation, a network computer, a mainframe, a kiosk, a server, or any other data processing system or combination thereof. In some other embodiments, event-driven orchestration system 200 may be configured as a distributed system where one or more components of event-driven orchestration system 200 are distributed across one or more networks in the cloud. The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 3A:
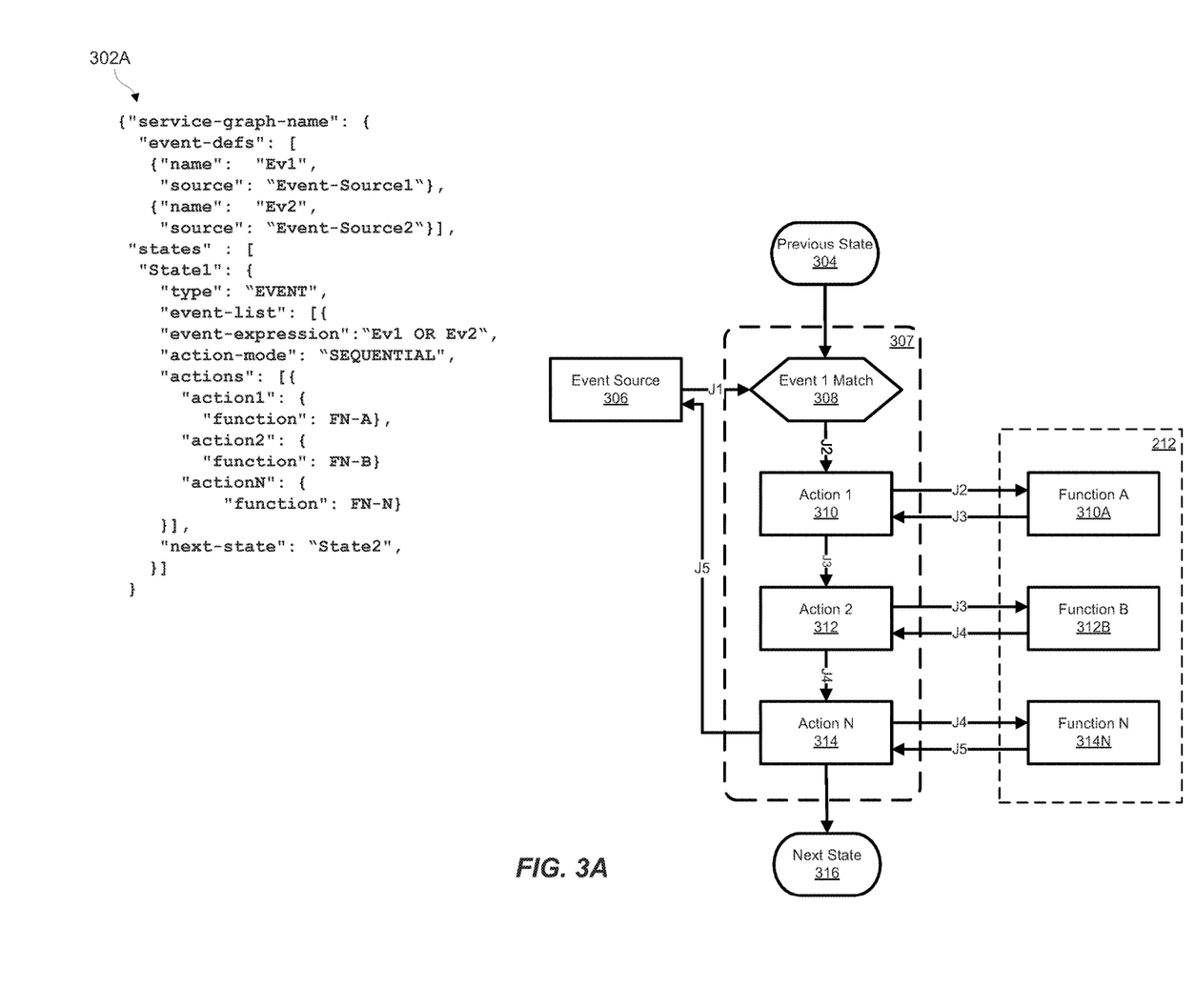
FIGS. 3A-3C illustrate event states with sequential and/or parallel executing actions.
Figure 3B:
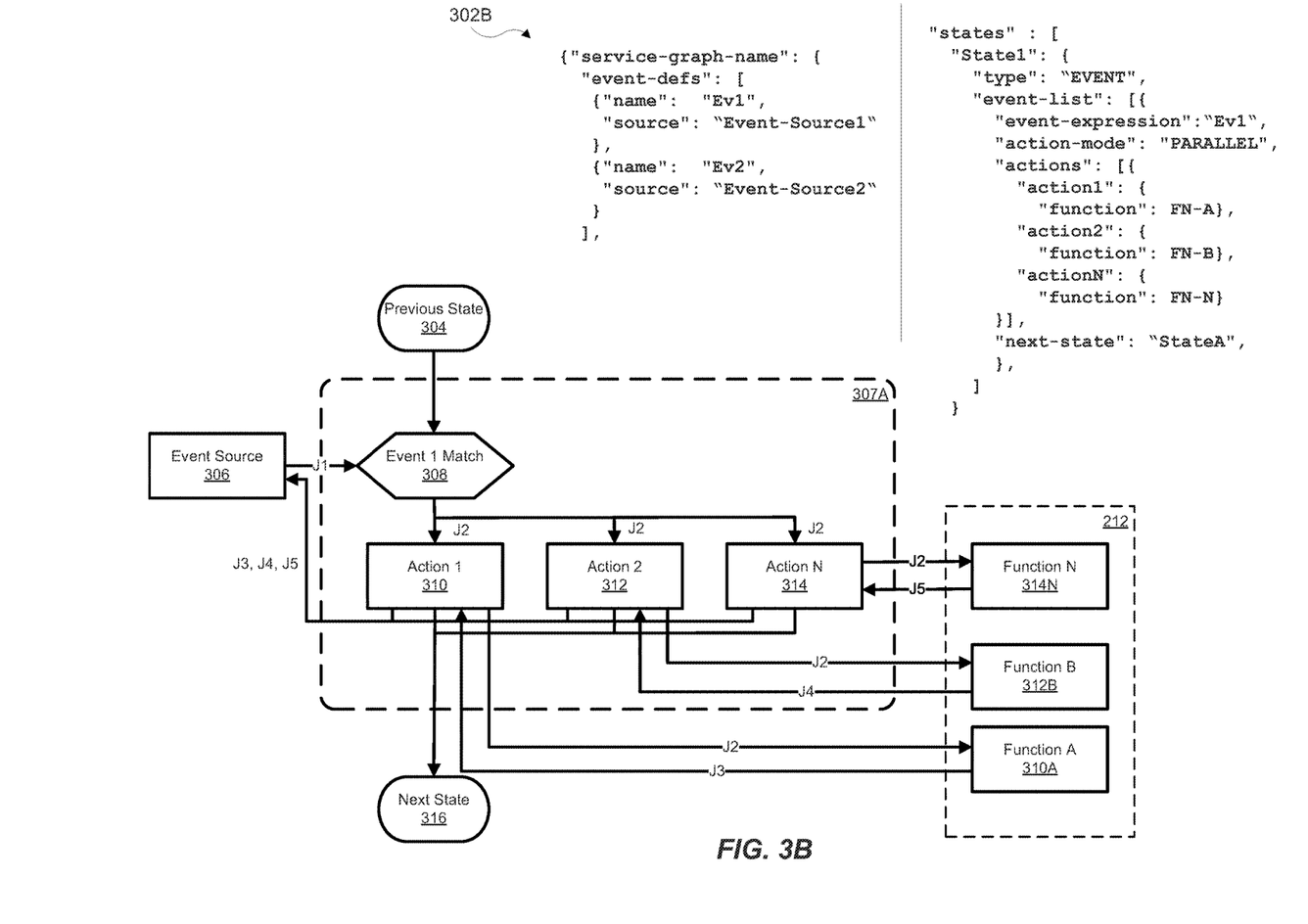
Figure 3C:
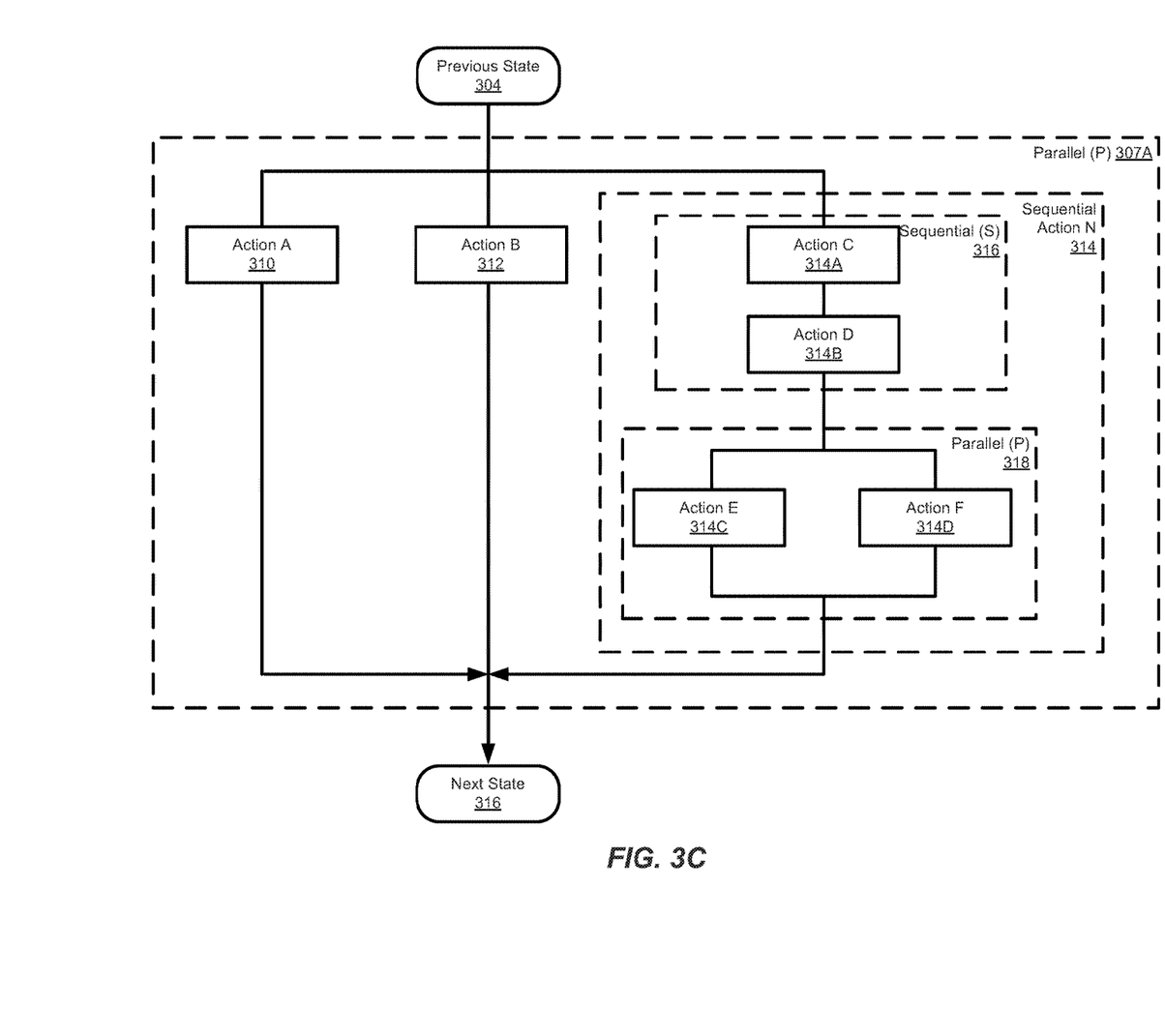

FIGS. 3A-3C illustrate event states with sequential and/or parallel executing actions. In the embodiments described below, the FGC 210 is responsible for receiving events and executing actions that invoke functions on the serverless function manager 212. However, it is appreciated that implementation of the described procedures are not limited to the FGC 210, and that any component or combination of components described in the various figures may be responsible for the operational procedures.

When the FGC 210 has entered the event state 307 from a previous state 304 and events arrive at the FGC 210 from event source 306, actions 310, 312 and 314 in the event state 307 are triggered and executed sequentially (FIG. 3A) or in parallel (FIG. 3B), where actions invoke corresponding serverless functions 312A, 314B and 314N in the serverless function manager 212. In one embodiment, multiple events may be combined using a Boolean expression (e.g., AND, OR logic) for each event state.

With reference to FIG. 3A, and as illustrated in pseudocode 302A, state machines may be defined as a function graph. In the depicted example, the function graph (function-graph-name) has two event definitions: (1) EV1 associated with event source 1 and (2) EV2 associated with event source 2. Recalling from above, each of the listed events may trigger the actions in a particular state. Actions are triggered when an event matches the Boolean expression ("event-expression" in pseudocode 302A) for the event state. Triggered actions will be executed followed by a transition to the next state (e.g., next state 316).

The Boolean expression itself consists of one or more operands (terms) and operators (e.g. AND, OR logic). For example, the Boolean operands are the names of the events that will trigger the state. In the depicted example, two events EV1 and EV2 are combined using a Boolean expression as "EV1 OR EV2" such that the event state 307 queues the events that satisfy the condition until all events have been received, which then causes the state to be triggered. Thus, in the example, when one of event EV1 OR event EV2 arrives, the condition is satisfied. Once satisfied, any actions (e.g., actions 310, 312 and 314) specified to be performed when the event(s) arrives may be executed. Upon completion of the actions having been successfully executed, the state machine 210 (FIG. 2) may transition to the next state 316.

In the depicted example, the actions 310, 312 and 314 are executed sequentially (as defined by the "action-mode" in pseudocode 302A) to invoke a function 310A, 312B and 314N, respectively. An event may also include an event request, which carries the event payload. The payload in the event request of the received event is passed, in sequence, from action 310 to action 314. For example, during previous state 304, event 1 is received at the event state 307. Event 1 has an event request with a payload J1. The event 1 (EV1) satisfies the conditions of the Boolean expression, defined above, and is determined to be a match by FGC 210.

After processing the payload J1 at action 310, the resulting payload J2 is passed as a request to and invokes function 310A. The function 310A executes the request at the serverless function manager 212 and returns a response payload J3 to action 310, which contains a list of action results that handle the result of the action when the response is received. Depending on the results of the response payload J3, various retry handling and next state transitions or termination may be invoked. Otherwise, the response J2 is passed to the next action 312, which sends the payload J3 as a request to and invokes function 312B. The function 312B executes the request at the serverless function manager 212 and returns a response payload J4 to action 312, which handles the response in a manner similar to action 310. Subsequently, the response J4 is passed to the next action 314 which sends the payload J4 as a request to and invokes function 314N. The function 314N executes the request at the serverless function manager 212 and returns a response payload J5 to action 312, which, if satisfying the event request, is passed back to the original event requestor (in this case, the event source 306).

In one embodiment, if the event state 307 receives an event request (e.g., event request J1) having a synchronous invocation, the corresponding action sends the request to the associated function (e.g., function 310A, 312B, 314N) and waits for a response from the serverless function manager 212 of the function before progressing to the next state 316. In another embodiment, if the event state 307 receives an event request J1 having an asynchronous invocation, the action sends the request to the associated function (e.g., 310A, 312B, 314N) and does not expect any response from the serverless function manager 212 of the function. Instead, the action transitions to the next state 316 after the event is sent to the serverless function.

Turning to FIG. 3B, FGC 210 operationally implements the procedures similar to those described above with respect to FIG. 3A, with the following exceptions. In the case of FIG. 3B, the actions 310, 312 and 314 in the event state 307A are executed in parallel (or concurrently), as opposed to being executed sequentially. This is reflected in pseudocode 302B in which the action-mode is listed as "PARALLEL" (as opposed to "SEQUENTIAL" in pseudocode 302A of FIG. 3A). Thus, each action 310, 312, 314 invokes a respective function 310A, 312B and 314N in parallel.

As illustrated, when an event is received from event source 306, the FGC 210 determines at 308 whether the payload matches a Boolean expression ("event-expression"), as defined in the pseudocode 302B. The payload may include, for example, a JSON payload J1. When the received event is determined to match the Boolean expression, the JSON payload J2 is passed to each action 310, 312 and 314 in the event state 307A in parallel (concurrently). Each action 310, 312 and 314 then invokes a respective function 310A, 312B and 314N at the serverless function manager 212. After processing, each function 310A, 312B and 314N concurrently returns a respective event response (e.g. JSON payload J3, J4 and J5) to the each action 310, 312 and 314 having previously invoked the function. The event response is then forwarded as combined event response, including JSON payloads J3, J4 and J5, back to the original event requestor (in this case, event source 306).

Once the parallel actions in event state 307A have been successfully executed, there is a transition to the next state 316. In one embodiment, if any of the parallel actions 310, 312 and 314 fail, FGC 210 performs retry processing. If during the retry processing, a maximum number of retries has been exceeded, there is a transition to the next state 316 as specified in the action result. As noted above, each action result specifies retry handling and next state transitions or termination. Since these retry operations occur in parallel, the transition specified will occur for the action result first exceeding the maximum number of retires. If more than one action 310, 312 and 314 fails, the transition will be to the next state for the action result of the first failed action in the list. For example, if there are three parallel actions 310, 312 and 314, and actions 312 and 314 fail, the transition will be to the action result for action 312.

In FIG. 3C, sequential and parallel actions may be combined to form action sets. A subset of actions may be grouped to be processed in sequence or in parallel. As depicted in the figure, actions 310, 312 and 314 are processed in parallel similar to the embodiment disclosed in FIG. 3B. However, action 314 is defined to include two subsets of actions—a first subset including actions 314A and 314B and a second subset of including actions 314C and 314D. The first and second subsets are nested and executed together as a sequential action 314, where the nested first subset of actions 316 is executed sequentially and the nested second subset of actions 318 is executed in parallel, as described above.

In one embodiment, the combination of actions may be expressed as an execution mode string that groups a subset of actions to be processed in sequence or in parallel. The subsets for sequential and parallel execution may be defined, for example, using the delimiters: S(action A, action B, . . . ) for sequential execution, and P(action D, action E, . . . ) for parallel execution. As explained, the subsets may be nested to define a combination of sequential and parallel executions, where the actions depicted in FIG. 3C may be defined as follows: P(A, B, S(C, D, P(E, F))). The parallel execution P(E, F) is nested within the sequential execution S(C, D, P(E, F)) which is in turn within P(A, B, S(C, D, P(E, F)).

It is appreciated that the embodiment of FIG. 3C is a non-limiting example of a combination of actions processed sequentially and in parallel, and that any number of permutations of actions may be processed.

Figure 4A:
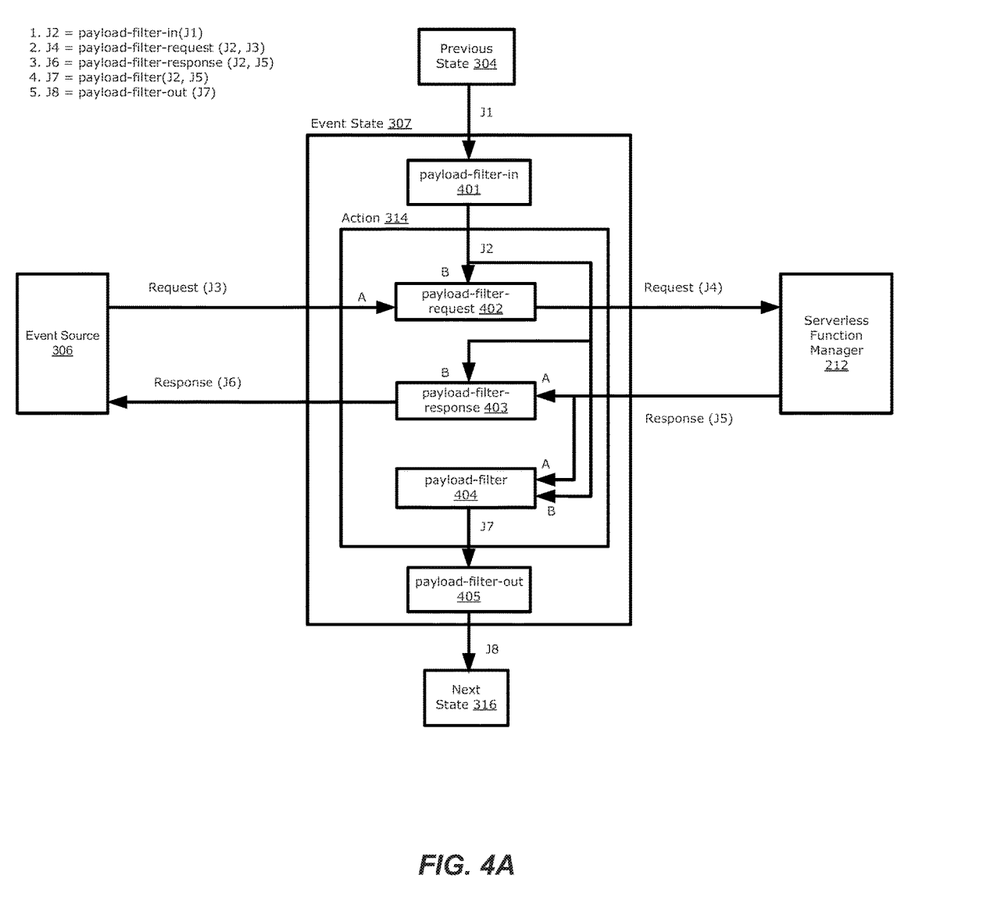
FIGS. 4A and 4B illustrate payload processing and filtering for an event state.
Figure 4B:
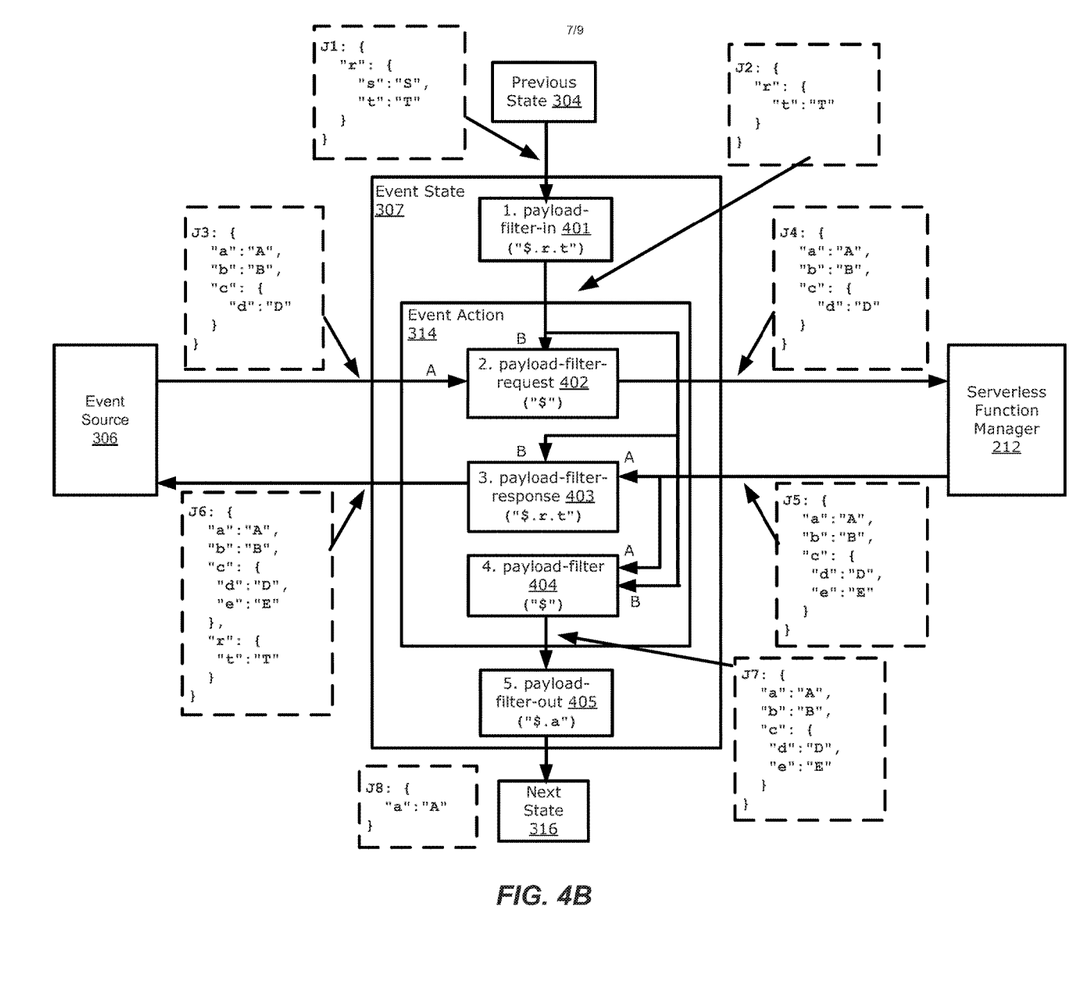

FIGS. 4A and 4B illustrate payload transformation and filtering for an event state. Events received from a corresponding event source 306, as explained above, may be defined in a function graph representing a state machine (for example, state machine 210A or 210B in FIG. 2) and referenced from the "event-expression" (Boolean expression) in the event state 307, such as event state B or C (FIG. 2). Events received from the event sources 306 may include an event request in the form of a payload, such as a JSON payload. Similarly, an event response received from the serverless function manager 212 may include an event response in the form of a payload, such as a JSON payload. For example, in the depicted embodiment, event requests may include JSON payloads J3 and J4 and event responses J5 and J6.

JSON payloads in event requests may be filtered and transformed before being sent to a function in the serverless function manager 212. Likewise, event responses may be filtered before being sent back to the event source 306 that made the original event request.

A payload filter (i.e. "PAYLOAD-FILTER") is a value in a JSON path expression, where the JSON path expression uses the symbol '$' to represent the outer level JSON object and inner elements are accessed using a dot ('.') notation. Nested elements can also be selected using further dots ($.x.y) to select sub-levels of the structure. For example, given the following JSON data:

```
{
  "x": 123,
  "y": ["a", "b", "c"],
  "z": {
    "a": true,
    "b": 4
  }
},
```

The following table shows the values obtained by applying various JSON path expressions to the data:

| Path | Value |
|---|---|
| $.x | 123 |
| $.y | ["a", "b", "c"] |
| $.z.a | true |
| $.y[1] | "b" |

As will become apparent from the below examples in FIGS. 4A and 4B, the "payload-filter" selects the portion of a first JSON payload (e.g., from a first event source) to be overwritten by, or added to, a second JSON payload (e.g. from a second event source). If the "payload-filter" is not specified, the filter defaults to '$' which represents the entire JSON payload. If the "payload-filter" is "null", the input is discarded so the JSON input represents an empty object "{ }".

An example JSON function graph definition with an event definition is:

```
{"function-graph-name": {
    "event-defs": [
        {
            "name": EVENT-NAME,
            "source": SOURCE-ID,
            "payload-filter-request": PAYLOAD-FILTER,
            "payload-filter-response": PAYLOAD-FILTER
        }
    ]
}}
```

In this context, the "name" is used by the "event-expression" in the event state, the "source" specifies the event source, the "payload-filter-request" specifies a filter for the JSON event request payload from the event source, and the "payload-filter-response" specifies a filter for the JSON event response payload before it is sent back to the event source.

As explained above, the event state 307 allows for handling of events from event sources 306, where the event state specifies a list of "event-expression" structures that are used to match incoming events. The first event to match an "event-expression" for the incoming state will cause actions for this "event-expression" to be executed followed by a transition to the next state. In one embodiment, the Boolean expression may handle multiple events. For example, a Boolean expression for multiple events may be defined as: "event-expression": (event A or event B) AND event C. A non-limiting example JSON function graph definition including the action-mode and actions to be taken upon arrival of a matching event state is:

```
{
    "name": "STATE-NAME",
    "type": "EVENT",
    "event-timeout": TIMEOUT,
    "events": [
        {
            "event-expression": EVENTS-EXPRESSION,
            "action-mode": ACTION-MODE,
            "actions": [
                ACTION-DEFINITION,
            ],
            "next-state": STATE-NAME
        }
    ]
}
```

The "event-timeout" field optionally specifies the maximum amount of time to wait for the events specified in the "event-expression." For example, if specified, an event timer starts may begin counting from zero when the event state is entered and is reset to zero when any event defined in the "event-expression" is received. If the event timer expires, there is a transition to the next-state. Otherwise, the event timer is stopped when an "event-expression" is triggered.

The events field lists events that may trigger actions in the specified event state. The first event to match an "event-expression" for the event state will cause actions for the "event-expression" to be executed followed by a transition to the next state 316.

The "event-expression" field, as explained, is a Boolean expression which consists of one or more operands (terms) and the Boolean operators: AND, OR. The Boolean operands are the names of events that will trigger the event state. For example: EVENT-EXPRESSION="event55" or EVENT_EXPRESSION="(event A or event B) and event 33". In the case of an AND operation between two or more events, the event state will queue the events that satisfy the condition until all of the events have been received, followed by a triggering of the event state. For example, in the expression above, if the event state receives "event 33", the event will be queued at the event state until the arrival of "event A" or "event B".

The field "action-mode": ACTION-MODE optionally specifies either a sequential or a parallel actions. The actions are executed in sequence when designated as "SEQUENTIAL" and concurrently when designated as "PARALLEL".

The actions field is a list of action definition constructs (ACTION-DEFINITION) that specify the actions to be performed when an incoming event matches the "event-expression".

The "next-state": STATE-NAME field specifies the name of the next state to transition to after all the actions for the matching event have been successfully executed.

Processing of the JSON payloads with events, for example as defined above, is now described with reference to FIG. 4A. In the disclosed embodiment, the events are processed in sequence by the FGC 210, although it is appreciated that any number of components may be responsible for such implementation and that the FGC 210 is merely one non-limiting example. It is also appreciated that the events may be processing concurrently or a combination of in sequence and/or concurrently, as described above.

The function graph representing the state machine receives an event payload (JSON payload) with the event request received from event source 306. The event payload is delivered to a serverless function manager 212 which invokes a corresponding function. In the disclosed embodiments, "A" refers to an event payload received from event source A, whereas "B" refers to a payload received from a previous state. The flow in FIGS. 4A and 4B of the JSON-encoded event payload is as follows.

1. The JSON payloads are processed through each event state 307 as follows. The input from the previous state 304 in sent to the payload filter "payload-filter-in" 401, which manipulates the payload J1 from the previous state. Processing of the payload J1 from the previous state 304 using the "payload-filter-in" 401 results in JSON payload J2.

2. As events are sent by event source 306, event requests sent with the events are input in the "payload-filter-request" 402. In the example, the event request is in the form of a JSON payload J3. Based on the filtering criteria, the "payload-filter-request" 402 modifies (e.g., adds) portions of the JSON payload J2 (from the previous state) to the JSON payload J3 (event request) before being sent in the event request J4 to the serverless function manager 212 for processing by a specified function. Accordingly, JSON payload J4 includes at least portions of JSON payloads J2 and J3.

3. Once the JSON payload J4 has been processed by a function at the serverless function manager 212, an event response is sent back to the events state 307 for further processing. For example, the serverless function manager 212 returns a JSON payload J5 after completion of processing the received payloads. At 403, the event response payload filter "payload-filter-response" modifies (e.g., adds) portions of the JSON payload J2 (from the previous state) to the JSON payload J5 (event response) before being sent in the event response J6 back to the event source 306 issuing the original event request.

4. Once the event response (JSON Payload J5) is received, the "payload-filter" 404 modifies (e.g., adds) portions of the JSON payload J2 received from the previous state to the JSON payload J5 in the event response from the serverless function manager 212 to produce JSON payload J7.

5. At 405, the "payload-filter-out" manipulates the JSON payload J7 before being output as JSON payload J8 to the next state.

In one example applied to the processing and filtering diagram of FIG. 4A, the event request payload filter "payload-filter-request" 402 selects a portion of the received JSON payload J2 to be overwritten by, or added to, the event request JSON payload J3 before being sent in the JSON payload J4 to the serverless function manager 212. For example, (a) if "payload-filter-request" 402 has a default value of $, the entire JSON payload J3 is passed to the serverless function manager 212 as JSON payload J4, and JSON payload J2 is not used; (b) if "payload-filter-request" 402 is null, the received JSON payload J2 is passed to the serverless function manager 212 as JSON payload J4, and JSON payload J3 is discarded; (c) if "payload-filter-request" 402 matches an item in the JSON payload J2 and matches an item in the JSON payload J3, the value of the item in JSON payload J3 is overwritten by the value of the item from the received JSON payload J2, and the modified JSON payload J4 is passed to the cloud provider 212; and (d) if "payload-filter-request" 402 matches the item in the JSON payload J2, but does not match an item in the JSON payload J3, then the received JSON payload J2 is added to the JSON payload J3, and the expanded JSON payload J4 is passed to the serverless function manager 212.

Similar processing applies to "payload-filter-response" 403 and "payload-filter" 404. For example, if payload-filter-request is "$.b" and the JSON payload (J3) is:

```
{
  "a":"A",
  "b":"B"
}
```

And JSON payload J2 is {"b":"B2"}, then the value "B" of matching item "b" in JSON payload J3 is overwritten by the value "B2" from JSON payload J2 and the modified JSON payload J4 that is passed to the serverless function manager 212 will be:

```
{
  "a":"A",
  "b":"B2"
}
```

If "payload-filter-request" is "$.c", and matches the JSON payload J2 {"c":"C"}, the expanded JSON payload J4 that is passed to the Cloud function will be:

```
{
  "a":"A",
  "b":"B",
  "c":"C"
}
```

Turning to FIG. 4B, a specific example of event filtering is disclosed. In the depicted example, the various payload filters may be used to merge JSON content from two event sources (A and B) and/or to modify JSON content. For example, in one embodiment, JSON content may be merged from multiple event sources such as: (1) "payload-filer-request" 402 merges JSON payload J2 and JSON payload J3 to form JSON payload J4; (2) "payload-filter-response" 403 merges JSON payload J2 and JSON payload J5 to form JSON payload J6; and action "payload-filter" 404 merges JSON payload J2 and JSON payload J5 to form JSON payload J7.

In another embodiment, content in the JSON payload may be modified. For example, "payload-filter-in" 401 may modify JSON payload J1 to form JSON payload J2 and "payload-filter-out" 405 may modify JSON payload J7 to form JSON payload J8.

It is appreciated that the examples above are non-limiting and that any number of examples of merging and modifying the JSON payloads may be implemented.

Figure 5A:
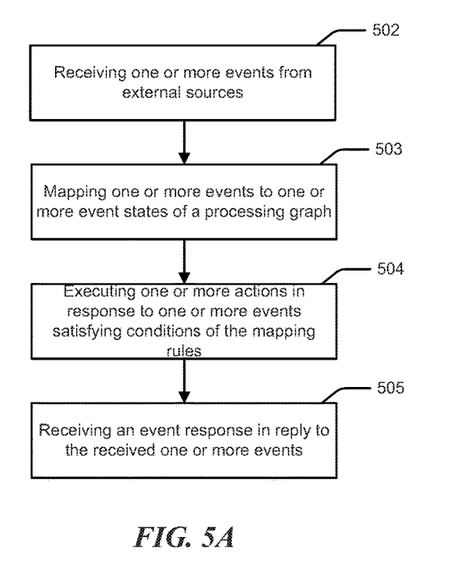
FIG. 5A-5C illustrate flow diagrams in accordance with the disclosed embodiments.
Figure 5B:
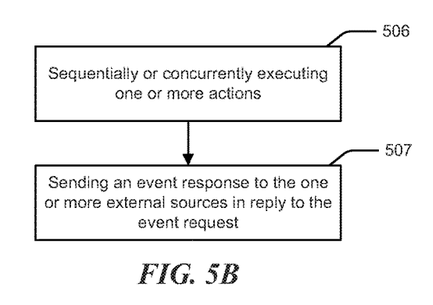
Figure 5C:
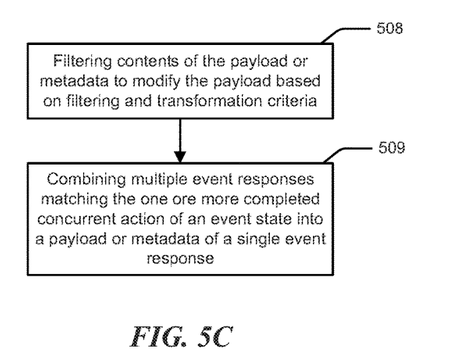

FIGS. 5A-5C illustrate flow diagrams in accordance with the disclosed embodiments. The procedures described in the diagram are implemented by the function graph controller for purposes of discussion. However, it is appreciated that any system component or combination of components may implement the procedures.

With reference to FIG. 5A, the FGC 210 receives events from different external sources in one embodiment at 502. The events may include an event request, such as a payload. The events are mapped to corresponding event states of a processing graph according to mapping rules at 503. These event states may include one or more actions. The actions are executed, at 504, in response to the received events satisfying conditions of the mapping rules. For example, a condition may be satisfied when two events are received or when either one or the other event is received. In either case, execution of the actions causes a corresponding serverless function at a serverless function manager to be invoked to process the event request. At 505, an event response is received in reply to the received one or more events, the event response based on execution of one or more tasks corresponding to a sequence of the executed one or more actions.

In another embodiment, and with reference to FIG. 5B, the FGC 210 sequentially or concurrently executes the actions by the event states at 506. Here, each of the actions invokes a corresponding serverless function such that a payload included in the event request is passed to the corresponding serverless function for execution.

In one other embodiment, with reference to FIG. 5C, the FGC 210 filters contents of the payload to modify the payload based on filtering and transformation criteria, at 508, and combines multiple event responses matching the completed concurrent action of an event state into a payload or metadata of a single event response, at 509.

Figure 5D:
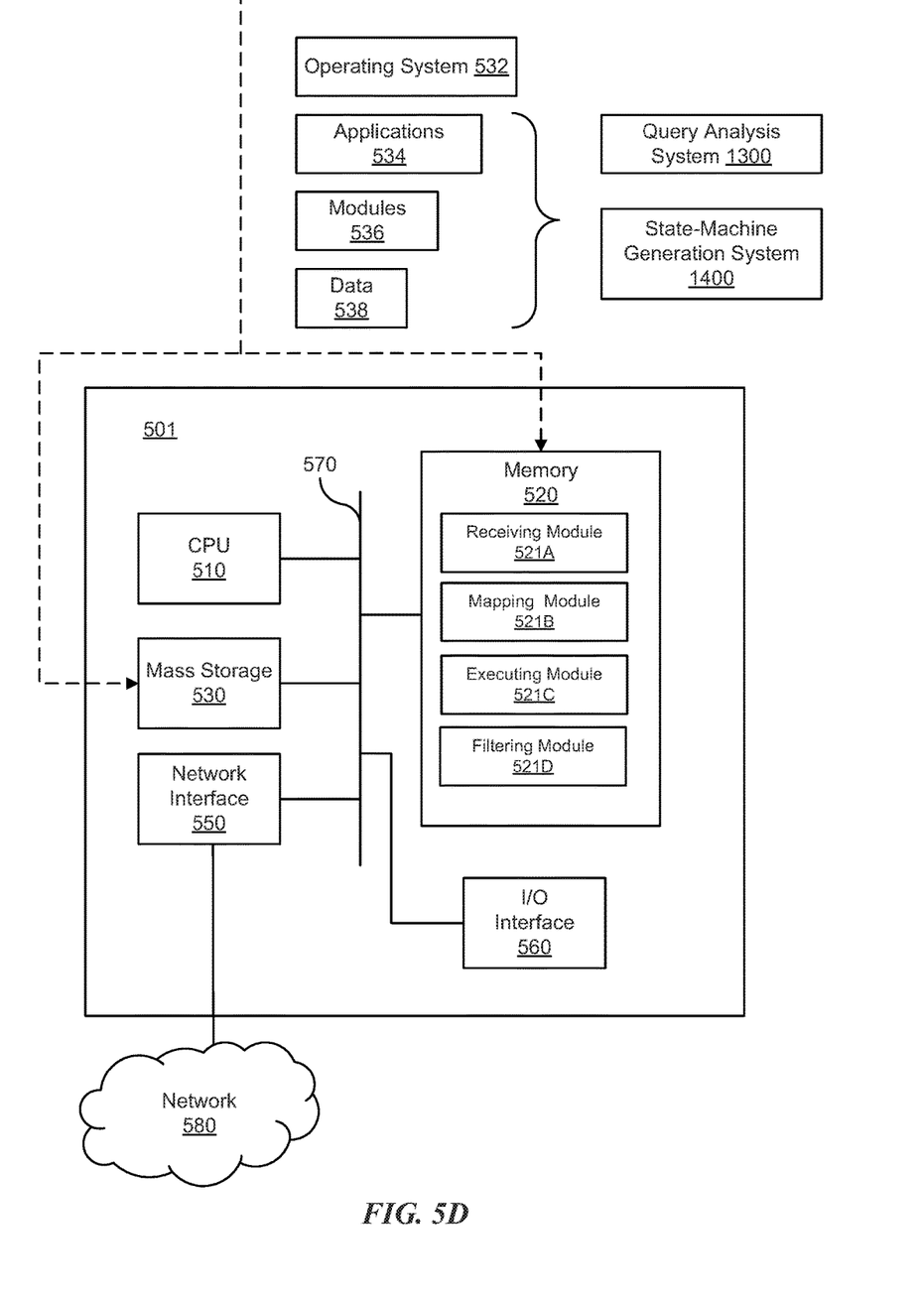
FIG. 5D illustrates a block diagram of a network system that can be used to implement various embodiments.

FIG. 5D is a block diagram of a network device that can be used to implement various embodiments. Specific network devices may utilize all of the components shown, or only a subset of the components, and levels of integration may vary from device to device. Furthermore, the network device may contain multiple instances of a component, such as multiple processing units, processors, memories, transmitters, receivers, etc. The network device may comprise a processing unit 501 equipped with one or more input/output devices, such as network interfaces, storage interfaces, and the like. The processing unit 501 may include a central processing unit (CPU) 510, a memory 520, a mass storage device 530, and an I/O interface 560 connected to a bus 570. The bus 570 may be one or more of any type of several bus architectures including a memory bus or memory controller, a peripheral bus or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. In one embodiment, the memory 520 includes a receiving module 521A receiving one or more events from one or more external sources (such as an HTTP gateway, storage, messaging or queuing services), the one or more events including an event request, a mapping module 521B mapping the one or more events to one or more event states of a processing graph according to mapping rules, an executing module 521C one or more actions by the one or more event states in response to the one or more event states being triggered by the mapped one or more events, wherein execution of the one or more actions causes a corresponding one or more serverless functions to be invoked and a filtering module 521D filtering contents of the payload to modify the payload based on filtering criteria.

The mass storage device 530 may comprise any type of storage device configured to store data, programs, and other information and to make the data, programs, and other information accessible via the bus 570. The mass storage device 1230 may comprise, for example, one or more of a solid state drive, hard disk drive, a magnetic disk drive, an optical disk drive, or the like.

Memory 520 and mass storage device 530 can include, or have stored therein, operating system 532, one or more applications 534, one or more program modules 536 and data 538. The operating system 532 acts to control and allocate resources of the processing unit 501. Applications 534 include one or both of system and application software and can exploit management of resources by the operating system 532 through program modules 536 and data 538 stored in memory 520 and/or mass storage device 530 to perform one or more actions. Accordingly, applications 534 can turn a general-purpose computer into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, a query analysis system 1300 and a state-machine generation system 1400 can be or form part of part of the application 534, include one or more modules 536 and data 538 stored in memory and/or mass storage 530 whose functionality can be realized when executed by one or more processor(s)/CPU(s) 510.

The query analysis system 1300 includes a validation component (not shown) that is configured to receive, retrieve, or otherwise obtain or acquire a query. For example, the query can correspond to a language-integrated query, amongst other types of queries. The validation component checks or validates the query as a function of a state machine component (also referred to as a state machine, such as state machines 210A and 210B in FIG. 2), which captures constraints of a target query language including but not limited to supported query operators and patterns of query operators (e.g., limits on the number of occurrences of query operators and relative ordering of query operators), for example. In one embodiment, the state machine component can be a type-based state machine that captures constraints as types and methods as discussed below. If the query does not meet the constraints of a target query language, for example, if an invalid query operator or invalid pattern of query operators is detected, the validation component can signal an error. In one other embodiment, the validation component can perform compile-time checking of the query thus mitigating the risk of runtime failure. Accordingly, the validation component can form part of a program language compiler.

The state-machine generation system 1400 includes an analysis component and a generation component (not shown). The analysis component can analyze target query-language semantics including grammar and type system to determine constraints or restrictions on the target query language, where the grammar describes acceptable syntax and the type system describes proper usage of data types. Based on the analysis, the generation component can produce a state machine (e.g., state machine component), such as the state machines 210A and 210B depicted in FIG. 2, that captures constraints on the target query language. In one embodiment, the state machine can be type-based or the generation component can produce a state machine of types. In this case, states can be encoded as types and transitions between states can be encoded as methods. The generation component can also receive one or more parameters indicating a desired size and/or complexity of a generated state machine. As a result, the state machine can include all constraints specified by the grammar and type system, a subset of the constraints, or even a superset of the constraints.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for coordinating execution of serverless functions, comprising:
executing an event state of a function graph after an execution of a previous state of the function graph, wherein the event state includes an expression of a trigger event and one or more actions coupled to the expression, and each action is used for triggering a serverless function;
receiving an event from an event source;
in response to the received event matching the trigger event, mapping the received event to the one or more actions of the event state based on a mapping rule;
executing the one or more actions of the event state to trigger one or more serverless functions to be performed; and
receiving a response from each of the one or more serverless functions based on executing the one or more actions.

2. The method of claim 1, further comprising:
sequentially or concurrently executing the one or more actions of the event state,
wherein each action of the one or more actions invokes a corresponding serverless function such that a payload or metadata included in the event is passed to the corresponding serverless function for execution.

3. The method of claim 2, further comprising sending an event response to the event source upon completion of executing a sequence of the one or more actions.

4. The method of claim 3, wherein the event response includes a single payload or metadata for the sequentially executed one or more actions.

5. The method of claim 3, wherein the event response includes a combined payload or metadata for the concurrently executed one or more actions.

6. The method of claim 2, further comprising:
filtering contents of the payload or metadata to modify the payload or metadata based on filtering and transformation criteria; and
combining multiple event responses matching completed actions of the concurrently executed one or more actions of the event state into a payload or metadata of a single event response.

7. The method of claim 1, further comprising independently executing a subset of the one or more actions of the event state.

8. The method of claim 7, wherein the subset is nested to define a combination of sequentially and concurrently executed one or more actions.

9. The method of claim 1, wherein in response to the event not being received, a timeout occurs after a predetermined period of time.

10. The method of claim 1, wherein the trigger event directs to an expression of events defined in the event state.

11. A device for coordinating execution of serverless functions, comprising:
a non-transitory memory storage comprising instructions; and
one or more processors in communication with the memory, wherein the one or more processors execute the instructions to:
execute an event state of a function graph after an execution of a previous state of the function graph, wherein the event state includes an expression of a trigger event and one or more actions coupled to the expression, and each action is used for triggering a serverless function;

receive an event from an event source;

in response to the received event matching the trigger event, map the received event to the one or more actions of the event state based on a mapping rule;

execute the one or more actions of the event state to trigger one or more serverless functions to be performed; and receive a response from each of the one or more serverless functions based on executing the one or more actions.

12. The device of claim 11, wherein the one or more processors further execute the instructions to:

sequentially or concurrently execute the one or more actions of the event state, wherein each action of the one or more actions invokes a corresponding serverless function such that a payload or metadata included in the event is passed to the corresponding serverless function for execution.

13. The device of claim 12, wherein the one or more processors further execute the instructions to send an event response to the event source upon completion of executing a sequence of the one or more actions.

14. The device of claim 12, wherein the one or more processors further execute the instructions to:

filter contents of the payload or the metadata to modify the payload or metadata based on filtering and transformation criteria; and combine multiple event responses matching completed actions of the concurrently executed one or more actions of the event state into a payload or metadata of a single event response.

15. The device of claim 11, wherein the one or more processors further execute the instructions to independently execute a subset of the one or more actions of the event state.

16. The device of claim 15, wherein the subset is nested to define a combination of sequentially and concurrently executed one or more actions.

17. A non-transitory computer-readable medium storing computer instructions for coordinating execution of serverless functions, that when executed by one or more processors, cause the one or more processors to perform the steps of:

executing an event state of a function graph after an execution of a previous state of the function graph, wherein the event state includes an expression of a trigger event and one or more actions coupled to the expression, and each action is used for triggering a serverless function;

receiving an event from an event source;

in response to the received event matching the trigger event, mapping the received event to the one or more actions of the event state based on a mapping rule;

executing the one or more actions of the event state to trigger one or more serverless functions to be performed; and receiving a response from each of the one or more serverless functions based on executing the one or more actions.

18. The non-transitory computer-readable medium of claim 17, further causes the one or more processors to perform the steps of:

sequentially or concurrently executing the one or more actions of the event state, wherein each action of the one or more actions invokes a corresponding serverless function such that a payload or metadata included in the event is passed to the corresponding serverless function for execution.

19. The non-transitory computer-readable medium of claim 18, further causes the one or more processors to perform the steps of sending an event response to the event source upon completion of executing a sequence of the one or more actions.

20. The non-transitory computer-readable medium of claim 18, further causes the one or more processors to perform the steps of:

filtering contents of the payload or metadata to modify the payload or metadata based on filtering and transformation criteria; and combining multiple event responses matching completed actions of the concurrently executed one or more actions of the event state into a payload or metadata of a single event response.

* * * * *